United States Patent Office 3,377,313
Patented Apr. 9, 1968

3,377,313
DISPERSION OF CARBON BLACK IN A THERMOPLASTIC POLYMER IN ADMIXTURE AND WITH SEPARATELY PREPARED OXYMETHYLENE POLYMER
Julius A. Jupa, Union, and John J. Sweeney, Clark, N.J., assignors to Celanese Corporation, a corporation of Delaware
No Drawing. Filed July 1, 1963, Ser. No. 292,154
22 Claims. (Cl. 260—41)

This invention relates to improved polymer compositions and, more particularly, to those polymer compositions comprising an oxymethylene polymer.

Oxymethylene polymers, having recurring —$CH_2O$— units have been known for many years. They may be prepared by the polymerization of anhydrous formaldehyde or by the polymerization of trioxane, which is a cyclic trimer of formaldehyde. Polyoxymethylene varies in thermal stability and in molecular weight, depending on its method of preparation.

High molecular weight polyoxymethylenes have been prepared by polymerizing trioxane in the presence of certain catalysts such as boron fluoride, coordinate complexes of boron fluoride and organic compounds as described in U.S. Patents 2,989,505, 2,989,506, 2,989,507, 2,989,509, all of which are by Donald E. Hudgin and Frank M. Berardinelli; 2,989,510, by George J. Bruni, and 2,989,511 by Arthur W. Schnizer. All the above patents are assigned to the same assignee as the subject application.

On some occasions it has been found desirable to incorporate a material such as carbon black into high molecular weight oxymethylene polymer to reduce the effects of weathering and particularly to reduce the effects of ultraviolet radiation. It has been found, however, that when carbon black is mixed with comparatively small amounts of the oxymethylene polymer prior to incorporation into the main mass of the polymer, the carbon black has an undesirable effect upon the polymer. For example, the carbon black in comparatively high concentrations tends to degrade the polymer resulting in the liberation of formaldehyde. This also occurs when carbon black is mixed directly with the main mass of the oxymethylene polymer.

In accordance with the subject invention, the carbon black is first mixed with and dispersed in a thermoplastic polymeric material which is inert with respect to comparatively high concentrations of carbon black and which is also inert with respect to the oxymethylene polymer into which it is to be incorporated. Thus, the thermoplastic material should be non-acidic and its decomposition products should be non-acidic. Suitable inert materials include polyolefins, such as polyethylene, polypropylene, polybutene, polyisobutylene, etc., as well as mixtures thereof and copolymers therewith as well as polystyrene, poly(α-methyl styrene), polymethylmethacrylate, poly(n-butyl methacrylate), poly(n-amyl methacrylate), polytetrafluoroethylene, polychlorotrifluoroethylene, etc. In addition to the normally high molecular weight polymers, low molecular weight polymers, having molecular weight as low as 1,500 or below may also be suitable. Also it may be feasible to utilize a liquid polymeric material if it is satisfactory in its other characteristics. The preferred range of molecular weight for the polymeric material is between about 500 and about 100,000.

In accordance with a preferred embodiment of this invention, the carbon black is mixed with the polymeric material in an amount between about 5 and about 75 weight percent, preferably between about 15 and 50 weight percent, of the carbon black-polymeric material mixture. The mixture of the carbon black and the polymeric material is thereafter mixed with and dispersed throughout the oxymethylene polymer in an amount sufficient that the carbon black is present in an amount between about 0.001 and about 25 weight percent, preferably between about 0.25 and 5 weight percent, based on the weight of the total polymer composition. The amount of oxymethylene polymer should be present in between about 60 and about 99.998 weight percent, preferably between about 90 and about 99.5 weight percent, based on the weight percent of the total composition. The presence of the carbon black, dispersed in the manner set forth, has been found to substantially improve the resistance of the polymer to degradation caused by outdoor weathering, particularly as a result of exposure to ultra-violet radiation, when used within the above proportions.

Particularly suitable carbon blacks are acidic blacks, e.g., channel blacks, preferably comprising particles having an average diameter in the range of about 5 to about 30 millimicrons. Also suitable are alkaline blacks, e.g., furnace blacks, preferable comprising particles having an average diameter in the range of about 20 to about 30 millimicrons. The particle diameters of the carbon blacks referred to above are arithmetic mean diameters measured from electron micrographs of the blacks. The preferred carbon blacks have a pH between about 3 and about 10.

In accordance with a preferred embodiment of this invention, the aforesaid mixture of carbon black and polymeric material is incorporated into an oxymethylene polymer containing carbon-to-carbon single bonds in the main polymer chain. In a particularly preferred embodiment of this invention, the oxymethylene polymer is a copolymer having at least one chain containing recurring oxymethylene units interspersed with —OR— groups in the main polymer chain where R is a divalent radical containing at least two carbon atoms directly linked to each other and positioned in the chain between the two valences, with any substituents on said R radical being inert, that is, those which do not include interfering functional groups and which will not induce undesirable reactions. Particularly preferred are copolymers which contain from 60 to 99.6 mol percent of recurring oxymethylene groups. In a preferred embodiment R may be, for example, an alkylene or substituted alkylene group containing at least two carbon atoms.

Among the copolymers which are utilized in accordance with this aspect of the invention are those having a structure comprising recurring units having the formula

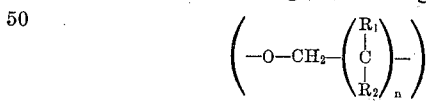

wherein $n$ is an integer from zero to 5 and wherein $n$ is zero in from 60 to 99.6 percent of the recurring units. $R_1$ and $R_2$ are inert substituents, that is, substituents which will not cause undesirable reactions.

A preferred class of copolymers are those having a structure comprising oxymethylene and oxymethylene recurring units wherein from 60 to 99.6 percent of the recurring units are oxymethylene units.

Particularly preferred oxymethylene polymers are those incorporated oxyalkylene units having adjacent carbon atoms and derived from cyclic ethers having adjacent carbon atoms. These copolymers may be prepared by copolymerizing trioxane with a cyclic ether having the structure

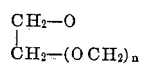

where $n$ is an integer from zero to two.

Examples of preferred polymers include copolymers of trioxane and cyclic ethers containing at least two adjacent carbon atoms such as the copolymers disclosed in U.S. Patent No. 3,027,352 by Cheves T. Walling, Frank Brown and Kenneth W. Bartz, which patent is assigned to the same assignee as the subject application.

Among the specific cyclic ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran, and butadiene monoxide.

The oxymethylene copolymers produced from the preferred cyclic ethers have a structure substantially composed of oxymethylene and oxyethylene groups in a ratio from about 250:1 to about 1.5:1.

In addition to the methods disclosed in U.S. Patent No. 3,027,352, other methods may be used to prepare oxymethylene polymers contemplated under this invention, including for example, those taught by Kern et al. in Angewandt Chemie 73 (6), pages 177 to 186 (Mar. 21, 1961).

The preferred oxymethylene polymers which are treated in accordance with this invention are thermoplastic materials having a melting point of at least 150° C. and are normally millable at a temperature of 200° C. They have a number average molecular weight of at least 10,000. These preferred polymers have a high thermal stability. For example, if the stabilized oxymethylene polymer used in a preferred embodiment of this invention is placed in an open vessel in a circulating air oven at a temperature of 230° C. and its weight loss is measured without removal of the sample from the oven, it will have a thermal degradation rate of less than 1.0 wt. percent/min. for the first 45 minutes and, in preferred instances, less than 0.1 wt. percent/min. for the same period of time.

The preferred oxymethylene polymers which are treated in this invention have an inherent viscosity of at least one (measured at 60° C. in an 0.1 weight percent solution in p-chlorophenol containing 2 weight percent of α-pinene). The preferred copolymers of this invention exhibit remarkable alkaline stability. For example, if the preferred copolymers are refluxed at a temperature of about 142° C.–145° C. in a 50% solution of sodium hydroxide in water for a period of 45 minutes, the weight of the copolymer will be reduced by less than one percent.

Oxymethylene homopolymers are included in the oxymethylene polymers which may be treated in accordance with this invention. Some suitable homopolymers which may be used are those in which the end groups have been reacted with an alkanoic acid such as acetic acid or an ether such as dimethyl ether as described in the aforementioned Kern et al. article. These reactants cause stable ester or ether end groups, e.g., acetyl or methoxy groups, to form at the ends of the polymer molecules.

As used in the specification and claims of this application, the term "copolymer" means polymers having two or more monomeric groups, including terpolymers and higher polymers. Suitable oxymethylene terpolymers are those having more than two different kinds of monomeric units such as those disclosed in U.S. patent application Serial No. 229,715, filed Oct. 10, 1962 by Walter E. Heinz and Francis B. McAndrew, which application is assigned to the same assignee as the subject application.

In a preferred embodiment of this invention, it is generally desirable to incorporate one or more thermal stabilizers into the oxymethylene polymer.

The proportion of stabilizer incorporated into the oxymethylene polymer depends upon the specific stabilization used. A proportion between about 0.05 and 10 wt. percent (based on the weight of polymer) has been found to be suitable for most stabilizers.

One suitable stabilizer system is a combination of (1) an anti-oxidant ingredient such as phenolic antioxidant, and most suitably, a substituted bisphenol, and (2) an ingredient to inhibit chain scission, generally a compound or a polymer containing trivalent nitrogen atoms.

A suitable class of alkylene bisphenols includes compounds having from 1 to 4 carbon atoms in the alkylene group and having from zero to 2 alkyl substituents on each benzene ring, each alkyl substituent having from 1 to 4 carbon atoms. The preferred alkylene bisphenols are 2,2'-methylene bis-(4-methyl-6-tertiary butyl phenol) and 4,4'-butylidene bis-(6-tertiary butyl-3-methyl phenol). Suitable phenolic stabilizers other than alkylene bisphenols include 2,6-ditertiary butyl-4-methylphenol, p-phenylphenol and octylphenol.

Suitable scission inhibitors include carboxylic polyamides, polyurethanes, substituted polyacrylamides, polyvinyl pyrollidone, hydrazines, compounds having 1 to 6 amide groups, proteins, compounds having tertiary amine and terminal amide groups, compounds having amidine groups, cycloaliphatic amine compounds, aliphatic acylureas and compounds containing at least two epoxy groups. Suitable scission inhibitors, as well as suitable antioxidants and proportions are disclosed in application Ser. No. 826,115 filed by Dolce on July 10, 1959, now Patent No. 3,152,101; application Ser. No. 831,720 filed by Dolce, Berardinelli and Hudgin on Aug. 5, 1959, now Patent No. 3,144,431; application Ser. No. 838,427 filed by Berardinelli on Sept. 8, 1959, now abandoned; application Ser. No. 838,832 filed by Dolce and Hudgin on Sept. 9, 1959, now Patent No. 3,200,090; application Ser. No. 841,690 filed by Kray and Dolce on Sept. 23, 1959, now abandoned; application Ser. No. 1,457 filed by Dolce and Berardinelli on Jan. 11, 1960, now Patent No. 3,133,896; application Ser. No. 4,881 filed by Kray and Dolce on Jan. 27, 1960, now Patent No. 3,156,669; application Ser. No. 147,092 filed by Dolce and Prichard on Oct. 23, 1961, now Patent No. 3,210,318 and French Patent No. 1,273,-219. The disclosures of the above-mentioned applications and patents are incorporated herein by reference.

The stabilizers may be incorporated into the oxymethylene polymer by dissolving both the polymer and the stabilizer in a common solvent and thereafter evaporating the solution to dryness. Alternatively, the stabilizers may be incorporated into the polymer by applying a solution of the stabilizer to finely divided polymer, as in a slurry, and thereafter filtering the polymer and evaporating to dryness. The stabilizer, in finely divided dry state may be blended into finely divided polymer in any suitable blending apparatus.

One suitable method of incorporation of the chemical stabilizers is by blending a dry solid stabilizer into the plastic polymer, while the latter is being kneaded as on heated rolls or through an extruder.

The initial mixture of the carbon black and the polymeric material may be added to the oxymethylene polymer with the stabilizers and may be mixed with the oxymethylene polymer after the stabilizers have been incorporated using similar techniques employing solutions, slurries and/or blends of finely divided solids. It may be convenient to mix the oxymethylene polymer with the stabilizers, e.g., the phenolic anti-oxidant and the scission-inhibitor first, e.g., at the time the polymer is synthesized, and subsequenly incorporate the carbon black-polymeric material mixture. For example, it is often beneficial to add phenolic anti-oxidant and scission-inhibitor to all of the polymer produced at a production facility. Later, the carbon black-polymeric mixture may be added only to that proportion of the polymer intended for certain special applications requiring the use of such carbon black, e.g., moldings which will be subjected to the action of a substantial amount of ultraviolet radiation, such as those used in the outdoors.

It has been found with other art methods of adding carbon black to oxymethylene polymers, that an acid-acceptor must be added to the polymer (this acid acceptor may be an additional amount of scission inhibitor or it may be another material which is known to react with free acid). In the subject invention it has been found that such an acid-acceptor is not necessary, and that only the amount of chain-scission inhibitor normally used for the oxymethylene polymer is needed. It is possible that if a very acid carbon black was used, some acid-acceptor might be desirable, but, if so, the amount of acid-acceptor needed would be much less than required by the prior art.

In a preferred embodiment a carbon black is used in which the minute particles have been mixed with water in an amount sufficient to form small beads having a diameter between about 0.010 inch and about 0.030 inch. The small beads have the advantage that they are easier to handle and the extremely finely divided carbon black is not so likely to be lost in handling.

The following examples further illustrate the invention.

EXAMPLE I

A copolymer of trioxane and ethylene oxide prepared with a boron trifluoride catalyst and containing about 2.0 wt. percent of oxyethylene groups was treated to remove unstable oxymethylene groups at the ends of the polymer chains, as disclosed in U.S. S.N. 102,097, filed Apr. 11, 1961 by Frank M. Berardinelli and was stabilized with 0.1% of cyanoguanidine and 0.5% 2,2′-methylene bis-(4-methyl-6-tertiary butyl phenol.)

Fifteen pounds of polyethylene having a molecular weight of approximately 1500 (Epolene EE-2) was mixed with about fifteen pounds of "Black Pearls-74" carbon black (pH=5) made by the channel process. The mixing took place in an intensive "Banbury" mixer having a capacity of about 40 pounds. Ambient temperature was used (that is, no heat was applied to the jacket or to the rotors). The carbon black was composed of spherical particles having an average ultimate particle diameter of about 17 millimicrons. These particles had previously been mixed with water in amounts to form small beads having a diameter of about 0.010 inch to 0.030 inch.

One part of the polyethylene-carbon black mixture was mixed with 99 parts of the oxymethylene copolymer in a ribbon blender for about fifteen minutes. The mixed material was fed to a 6½ inch two-stage Sterling extruder operating at a material temperature of from 360° F. to 390° F. After extrusion the material was pelletized and then molded into the shape of 4 x 10 inch boxes in an 8 oz. Reed-Prentice injection molding machine. The color was excellent and exhibited no streaking. The molding characteristics were good. After being maintained at 180° F. for three weeks, there was no exudation on the boxes. The material had a tensile strength of 8,170 p.s.i. an elongation of 35%, an Izod impact strength of 0.96 ft. lb. per inch and a tensile impact strength of 42.0 ft. lb. per square inch. The percentage of polymer weight loss per minute, determined by heating the polymer in an open vessel in a circulating air oven at a temperature of 230° C. (known as $K_{D230}$) was 0.017.

As used in the specification and claims of this application, (1) the term "inert" means that the material described has no undesirable reaction with, or effect upon, the material with respect to which it is inert; (2) the term "mixing" or "mixed with" includes any method by which the ingredients may be associated with each other, including, for example, mechanically mixing solid and/or liquid ingredients, precipitation of one or more ingredients on other ingredients, encapsulation of one ingredient by another (for example, the individual particles of carbon black may be encapsulated by the inert thermoplastic polymeric material, such as polyethylene, etc., during the polymerization process in which the inert thermoplastic polymeric material is formed; as a specific example, the carbon black may be dispersed in a liquid medium, such as toluene, a catalyst is added, and then ethylene gas is bubbled through the suspension so that the ethylene gas polymerizes directly on the surface of the carbon black particles, thereby encapsulating them, as disclosed in an article entitled "New Method Sheathes Fibers in Polyethylene" by Herbert P. James which appeared on page 1 of the Daily News Record, New York City, June 19, 1963), etc.; (3) the term "oxymethylene" includes substituted oxymethylene, where the substituents are inert with respect to the other materials present under the conditions involved, including being free of interfering functional groups.

It is to be understood that the foregoing detailed description is given merely by way of illustration and that many variations may be made therein without departing from the spirit of our invention.

Having described our invention what we desire to secure by Letters Patent is:

1. A composition of matter comprising:
   (1) a dispersion of (a) carbon black in (b) a thermoplastic polymeric material, in admixture with
   (2) separately prepared oxymethylene polymer, said separately prepared oxymethylene polymer being the sole oxymethylene polymer in said composition and said thermoplastic polymeric material being inert with respect to said carbon black and said oxymethylene polymer.

2. The composition of matter of claim 1 wherein said carbon black has an average particle diameter between about 5 and about 30 millimicrons.

3. The composition of matter of claim 1 wherein said carbon black has a pH between about 3 and about 10.

4. The composition of matter of claim 1 wherein said thermoplastic polymeric material has a molecular weight between about 500 and about 100,000.

5. The composition of matter of claim 1 wherein said carbon black is present in an amount between about 0.001 and about 25 weight percent of the total composition.

6. The composition of matter of claim 5 wherein said thermoplastic polymeric material is present in an amount between about 5 and about 75 weight percent of the total amount of (a) and (b) present.

7. The composition of matter of claim 1 wherein said thermoplastic polymeric material is polyethylene.

8. The composition of matter of claim 7 wherein said polyethylene has a molecular weight of approximately 1,500.

9. The composition of matter of claim 1 wherein said oxymethylene polymer has a melting point above about 150° C.

10. The composition of matter of claim 9 wherein said oxymethylene polymer is a copolymer having at least one chain containing from 60 to 99.6 mol percent of recurring oxymethylene groups interspersed with —OR— groups in said chain where R is a divalent radical containing at least two carbon atoms directly linked to each other and positioned in the chain between the two valences, with any substituents on said R radical being inert.

11. A composition of matter comprising:
   (1) a dispersion of (a) between about 0.001 and about 25 weight percent of carbon black having an average particle diameter between about 5 and about 30 millimicrons and a pH between about 3 and about 10, in (b) a thermoplastic polymeric material in an amount between about 5 and about 75% of the total weight of said carbon black and said thermoplastic polymeric material, in admixture with
   (2) between about 60 and about 99.998 weight percent of a separately prepared oxymethylene copolymer having a melting point above about 150° C. and having at least one chain containing from 60 to 99.6 mol percent of recurring oxymethylene groups interspersed with —OR— groups in said chain, where R is a divalent radical containing at least two carbon atoms directly linked to each other and positioned in the chain between the two valences, with any substituents on said R radical being inert, said separately prepared oxymethylene copolymer being the sole oxymethylene polymer in said composition and said thermoplastic polymeric material being inert with respect to said carbon black and said oxymethylene copolymer.

12. A process of incorporating carbon black into an oxymethylene polymer comprising the steps of
(1) mixing
(a) carbon black and
(b) a thermoplastic polymeric material which is inert with respect to
(i) said oxymethylene polymer and
(ii) said carbon black and
(2) mixing the mixture formed in (1) with an oxymethylene polymer.

13. The process of claim 12 wherein said carbon black has an average particle diameter between about 5 and about 30 millimicrons.

14. The process of claim 12 wherein said carbon black has a pH between about 3 and about 10.

15. The process of claim 12 wherein said thermoplastic polymeric material has a molecular weight between about 500 and about 100,000.

16. The process of claim 12 wherein said carbon black is present in an amount between about 0.001 and about 25 weight percent of the total composition.

17. The process of claim 12 wherein said thermoplastic polymeric material is present in said mixture (1) in an amount between about 5 and about 75 weight percent of said mixture (1).

18. The process of claim 15 wherein said thermoplastic polymeric material is polyethylene.

19. The process of claim 18 wherein said polyethylene has a molecular weight of approximately 1,500.

20. The process of claim 12 wherein said oxymethylene polymer has a melting point above about 150° C.

21. The process of claim 20 wherein said oxymethylene polymer is a copolymer having at least one chain containing from 60 to 99.6 mol percent of recurring oxymethylene groups interspersed with —OR— groups in said chain where R is a divalent radical containing at least two carbon atoms directly linked to each other and positioned in the chain between the two valences, with any substituents on said R radical being inert.

22. A process of incorporating carbon black into an oxymethylene polymer comprising the steps of
(1) mixing
(a) between about 0.001 and about 25 weight percent, based on the weight of the final polymeric mixture, of carbon black having an average particle diameter between about 5 and about 30 millimicrons and a pH between about 3 and about 10, and
(b) a thermoplastic polymeric material in an amount between about 5 and about 75% of the total weight of said carbon black and said thermoplastic polymeric material, said thermoplastic polymeric material being inert with respect to
(i) said oxymethylene polymer and
(ii) said carbon black
said thermoplastic polymeric material having a molecular weight between about 500 and about 100,000, and
(2) mixing the mixture formed in (1) with between about 60 and about 99.998 weight percent of an oxymethylene copolymer having a melting point above about 150° C. and having at least one chain containing from 60 to 99.6 mol percent of recurring oxymethylene groups interspersed with —OR— groups in said chain, where R is a divalent radical containing at least two carbon atoms directly linked to each other and positioned in the chain between the two valences, with any substituents in said R radical being inert.

References Cited
UNITED STATES PATENTS

| | | | |
|---|---|---|---|
| 3,027,352 | 3/1962 | Walling et al. | 260—67 |
| 3,169,938 | 2/1965 | Evers et al. | 260—37 |
| 3,183,212 | 5/1965 | Hopff et al. | 260—67 |

MORRIS LIEBMAN, *Primary Examiner.*

J. H. DERRINGTON, *Assistant Examiner.*